Oct. 25, 1949.   R. L. TWEEDALE   2,485,944
POWER TRANSMISSION
Filed Aug. 7, 1947
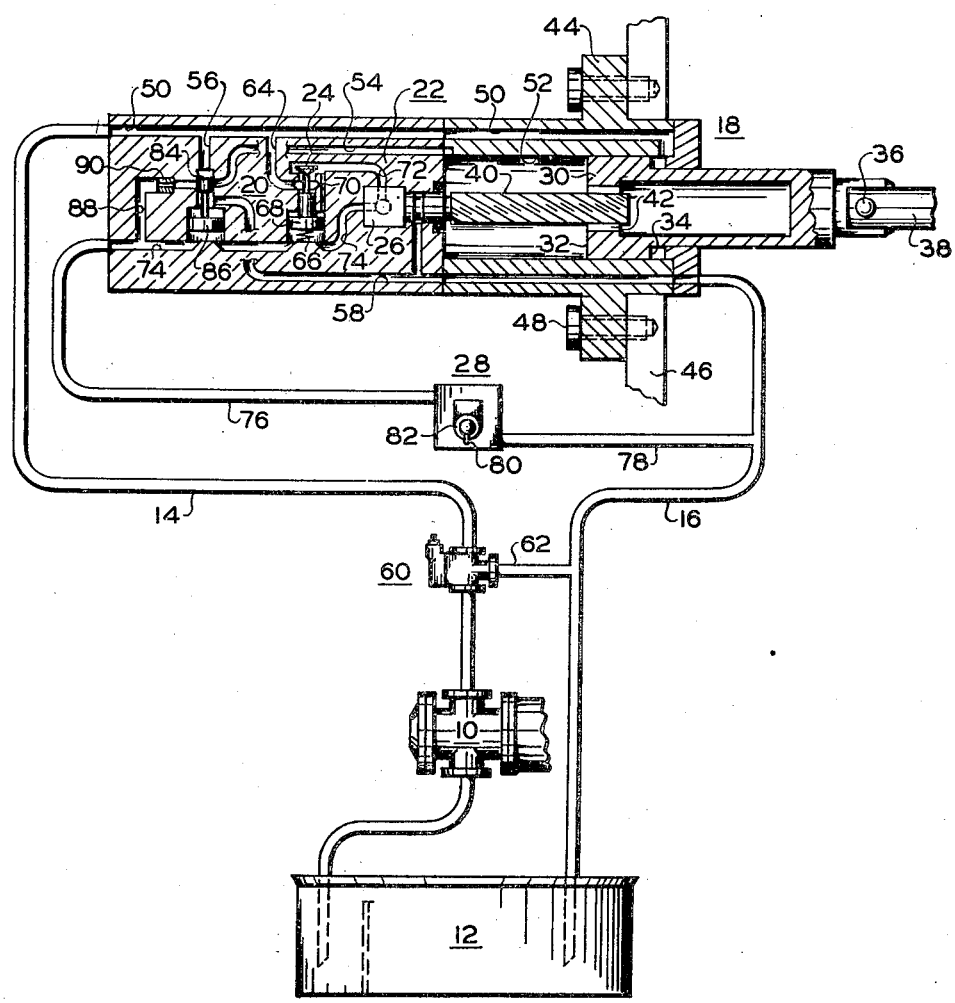
INVENTOR.
Ralph L. Tweedale Patented Oct. 25, 1949

2,485,944

UNITED STATES PATENT OFFICE 2,485,944

POWER TRANSMISSION

Ralph L. Tweedale, Birmingham, Mich., assignor to Vickers Incorporated, Detroit, Mich., a corporation of Michigan Application August 7, 1947, Serial No. 767,017

15 Claims. (Cl. 121—41)

This invention relates to power transmissions, particularly to those of the type comprising two or more fluid pressure energy translating devices, one of which may function as a pump and another as a fluid motor.

More particularly, the invention relates to power operated servo motor circuits. Hydraulic servo motors are employed universally as operators for machinery requiring considerable force to move an element through any limited distance or portion thereof. One of the inherent advantages of a servo motor is that its rate of travel remains relatively constant regardless of load.

Partially due to the substantially non-compressibility of pressure fluid used in a servo motor transmission, the rate and distance of travel as well as the position of the servo piston can be accurately controlled by the standard flow controls. Such controls are generally attached to the frame of a servo motor or made integral therewith. In conjunction with the operating controls, some form of follow-up system is usually employed whereby the movement of the servo piston cancels out the initial signal or operation causing the motion.

A typical servo motor circuit is described in the patent to Tweedale (No. 2,253,663). In that disclosure, the servo motor was both operated by and controlled by the difference in pressure between the flow control valves and the supply pressure. In the present invention, although the control is basically the same, the full supply pressure is employed for operating the servo, thereby increasing the speed of operation. By employing a directional valve capable of instantly providing full opening and responsive to changes in pressure in the control circuit, uniform response at all points of the servo motor travel is accomplished.

The general object of this invention is to provide a servo motor control circuit incorporating all of the features and advantages related above.

Another object is to provide a servo motor circuit incorporating follow-up and hydraulic remote control features therein.

Still another object is to provide a servo motor operating circuit in parallel with the control circuit wherein the adjustable flow rate in the control circuit controls the position of the servo motor piston.

An object is to provide an independent bleed circuit of relatively small flow rate capacity to supplement the inherent follow-up features of the servo motor transmission and prevent its overtravel.

Another object of the invention is to provide a servo motor and control in the form of a unitary structure in which all elements, except the remote control valve itself, are contained within a single body as a packaged article.

Summarily, the object of this invention is to provide a servo motor operating circuit in combination with, first, a control circuit for remotely controlling the servo piston position and incorporating follow-up features and, second, a supplemental follow-up circuit for independently assisting the follow-up system to prevent overtravel.

Further objects and advantages of the present invention will be apparent from the following description, reference being had to the accompanying drawing wherein a preferred form of the present invention is clearly shown.

In the drawing the single figure is a diagrammatic view of a servo motor transmission incorporating a preferred form of the present invention.

The operating circuit includes a pump 10 and tank 12 as a source of pressure fluid supply connected by pressure and return conduits 14 and 16, respectively, to a servo motor 18 and controlled by the directional valve 20. Connected to the source of pressure fluid supply and parallel with the operating circuit is a control circuit comprising a first flow control valve 22 consisting of a pressure responsive compensating valve 24 and variable throttle 26 in series with a second flow control valve 28.

The servo motor 18 employs a differential piston 30 having a large head end 32 and smaller rod end 34 and is adapted to be coupled to a load device by means of pin 36 and link 38. The variable throtttle 26 of the first flow control valve 22 is mechanically coupled to servo piston 30 by means of helically splined shaft 40 riding in the female spline 42 of piston 30 whereby any longitudinal movement of piston 30 rotatably adjusts the opening of throttle 26.

The servo motor body 44, which is mounted on the frame member 46 by means of bolts 48, is provided with passage 50 connecting conduit 14 to the cylinder bore 52 at the rod end 34 of piston 30. The head end 32 of cylinder 52 is selectively connected by means of passages 54, 56, or 58 to pressure conduit 14 or return conduit 16, respectively, which are controlled by directional valve 20. A relief valve 60 is employed in the pressure conduit 14 and is provided with a discharge line 62 to the return conduit 16 and tank 12.

The compensating valve 24 is connected to the source of pressure fluid supply by means of pressure conduit 14 and passages 50 and 64. The valve 24 is normally held open by spring 66 and is pressure controlled by differential pressure operating on the opposite faces of valve piston 68 through passage 70. Pressure fluid passing through the valve 24 is carried by passage 72 to throttle 26 and thence by passage 74, conduit 76, flow control valve 28, conduit 78, and return conduit 16 to tank 12. The passage 74, although continuous, is illustrated as utilizing the bottom of the chambers housing piston 68 and directional valve 20 as portions of the passage 74.

The flow control valve 28 is preferably constructed similar to valve 22 which employs a variable throttle 26 and a pressure balanced compensator 24. By employing a manually operated valve of that type, the operating lever 80 and dial 82 can be readily calibrated in terms of servo motor piston travel. Therefore, the second flow control valve, which is merely connected to the system by a conduit, may be located at any remote point.

The directional valve 20 is pressure actuated by the difference in pressure between the pressure conduit 14 and the control circuit conduit 76. In other words, the differential pressure actuating the directional valve 20 is the difference in pressure in the control circuit before and after the first flow control valve 22. For purposes of illustration, the pressure in conduit 76 (the intermediate pressure in the control circuit between the two flow control valves) has been calculated to be normally one-half of the pump operating pressure. Therefore, the smaller piston 84 (subject to pump pressure) of the directional valve has an area half the size of the larger piston 86 in communication with the intermediate pressure of conduit 76. For the same reason, the differential area 34 of servo piston 30 is one-half the area 32.

Although the servo motor transmission described provides for an intermediate pressure (in conduits 74 and 76), approximately 50% of the pump pressure, any percentage might have been used providing the piston areas 84 and 86 of directional valve 20 were also changed. In other words, if two-thirds the pressure drop through the control circuit took place through the first flow control valve 22, then the area of piston 86 would be three times the area of piston 84.

A follow-up or bleed circuit having a comparatively low flow rate comprising a passage 88 employing a restricted portion 90 has been provided and is controlled by the small piston 84 of the directional valve 20. The passage 74 may thus be selectively connected through a restricted passage either with the pressure fluid source or the tank passage 58.

In operation, the position of the servo motor piston 30 is controlled by the selected position of operating lever 80 of flow control valve 28. If lever 80 was shifted to open the throttle and increase the flow rate through the second flow control valve 28, the intermediate control pressure in conduit 76 and passage 74 would immediately drop below normal (one-half of the pump 10 pressure in conduit 14). The pressure force against piston face 84 would then be greater than the opposing force against piston 86 and consequently the directional valve 20 would be moved downward and establish communication between passage 56 and 54.

Pressure fluid would thus be admitted to cylinder 52 and the resultant force against piston area 32 would predominate over the force of the pressure against the smaller area 34 and consequently, the piston 30 would be moved to the right. The movement of piston 30 would rotate the helical spline 40 which in turn would open the throttle 26 until the flow through the first flow control valve 22 balances the rate through the valve 28. When the flow rates through the valves 22 and 28 are equal, the intermediate pressure is normal and directional valve 20 would be moved upward to block the communication between passage 56 and 54. This stops the servomotor.

If the operating control 80 is shifted so as to decrease the flow rate through valve 28, the intermediate pressure in 74 will be increased causing directional valve 20 to rise and establish communication between passage 54 and passage 58 whereby pressure fluid in the head end of cylinder 52 will be discharged to tank 12, and the pressure against rod end 34 will shift the servo piston 30 to the left. Shifting servo piston 30 to the left will close the throttle 26 of flow control valve 22 thereby reducing the rate of flow into passage 74 and 76.

Regardless of the direction of travel of the servo motor piston 30, the operating fluid directed against either piston face 32 or 34 is supplied from the source at full operating pressure. In earlier devices, one face of the piston was connected to the intermediate pressure of the control circuit and therefore the relative rate of travel changed in proportion to the change in intermediate pressure. In the present invention, the rate of travel of the servo piston remains constant regardless of its position.

In accordance with the general principles of a follow-up system, the further the servo piston travels to the left, the smaller will the throttle opening become until the flow rate through it equals the reduced flow rate through valve 28 and the intermediate pressure of the control circuit again becomes normal. When the falling intermediate pressure reaches normal (one-half the pump pressure) in the transmission design illustrated, the directional valve will be moved downward and block passage 54 thereby producing a back pressure against the piston head 32 balancing the rod end pressure against surface 34 and stopping the servo motor piston at a point corresponding to the selected setting of valve 28.

The simple follow-up feature, as described above, has one draw-back in that the ultimate actuation of the throttle 26 lags the setting of directional valve 20. In other words, the sequence of events initiated by the setting of the directional valve 20 and terminated by the resetting of that valve require at least a small interval of time. The follow-up operation, such as the adjustment of the throttle, will lag the final setting of the original valve thereby causing overtravel of the servo piston and hunting at the end of the stroke.

In the present invention, an auxiliary or supplemental bleed circuit comprising a passage 88 and a restriction 90 therein has been provided. Independent of the follow-up operation of the servo motor and throttle 26 where the directional valve is shifted to cause a sequence of operation to increase or decrease the intermediate pressure between the flow control valves, the piston 84 uncovers the opening to passage 88. If the piston 84 is lowered, pressure fluid from the supply source is introduced into passage 74 to increase the intermediate pressure at the same time the servo motor is opening the throttle 26 to accomplish the same results. Inversely, the raising of the piston 84, as a result of excessive intermediate pressure in the control circuit, permits pressure fluid to be bled off through the passage 88 and restriction 90 to passage 58 and tank 12 and thereby reduce the intermediate pressure in cooperation with but independent of the follow-up function of closing throttle 26. Therefore, the flow of fluid through passage 88 anticipates the function of throttle 26, and although tending to slow down the servo motor's deceleration rate, overtravel or hunting is practically eliminated.

It will thus be seen that the present invention provides a hydraulic transmission for remotely controlling a servo motor incorporating novel follow-up features. This is accomplished by providing a control circuit employing two flow control valves in series, and a directional valve responsive to variations in the flow rate through the control circuit to position the servo motor piston. A separate bleed or compensating circuit has been provided to supplement or anticipate the inherent follow-up features of the transmission and prevent overtravel.

While the form of embodiment of the invention as herein disclosed constitutes a preferred form, it is to be understood that other forms might be adopted, all coming within the scope of the claims which follow.

What is claimed is as follows:

1. A remotely controlled power operated servo motor circuit with hydraulic follow-up comprising a source of pressure fluid supply, a servo motor connected to the supply, two flow control valves connected in series in a control circuit to the supply, a pressure actuated directional valve for controlling the direction of travel of the servo motor and responsive to the difference in pressure between the source of supply and the intermediate pressure between the flow control valves, means for selectively varying the rate of flow through the second flow control valve to effect movement of the servo motor, and means linking the servo motor to the first flow control valve whereby the first valve will be automatically adjusted to a flow rate equal to the flow rate through the second valve.

2. A remotely controlled power operated servo motor circuit with hydraulic follow-up comprising a source of pressure fluid supply, a servo motor connected to the supply, two flow control valves connected in series in a control circuit to the supply, a pressure actuated directional valve for controlling the direction of travel of the servo motor and responsive to the difference in pressure between the source of supply and the intermediate pressure between the flow control valves, means for selectively varying the rate of flow through the second flow control valve to effect movement of the servo motor, and means linking the servo motor to the first flow control valve whereby the first valve will be automatically adjusted to a flow rate equal to the flow rate through the second valve, and means controlled by the directional valve for introducing pressure fluid into the control circuit between the flow control valves when the intermediate pressure is below normal or relieving the excess pressure therefrom to assist the first flow control valve in re-establishing normal intermediate pressure and prevent overtravel of the servo motor in either direction.

3. A remotely controlled power operated servo motor circuit with hydraulic follow-up comprising a source of pressure fluid supply, a servo motor employing a differential piston connected to the supply, two flow control valves connected in series in a control circuit to the supply, a pressure actuated directional valve for controlling the direction of travel of the servo motor and provided with differential pressure areas equivalent to the differential areas of the servo motor piston and responsive to the difference in pressure between the source of supply and the intermediate pressure between the flow control valves, means for selectively varying the rate of flow through the second flow control valve to effect movement of the servo motor, and means linking the servo motor to the first flow control valve whereby when the flow rate of the second flow control valve is adjusted to maintain a differential pressure between the flow control valves and the source of pressure fluid equivalent to the differential areas of the directional valve, the first valve will be automatically adjusted to a flow rate equal to the flow rate through the second valve.

4. A remotely controlled power operated servo motor circuit with hydraulic follow-up comprising a source of pressure fluid supply, a servo motor connected to the pressure fluid supply, an adjustable flow control valve hydraulically connected to the pressure fluid supply and mechanically coupled to and actuated by movement of the servo motor, a directional valve responsive to any variation in the inlet pressure of the flow control valve for controlling the direction of travel of the servo motor, and means for selectively increasing or decreasing the inlet pressure of the flow control valve to produce a cooperative movement of the servo motor and in turn an adjustment of the flow control valve rate until the normal inlet pressure has been re-established.

5. A remotely controlled power operated servo motor circuit with hydraulic follow-up comprising a source of pressure fluid supply, a servo motor connected to the pressure fluid supply, an adjustable flow control valve hydraulically connected to the pressure fluid supply, a directional valve responsive to any variation in the normal discharge pressure of the flow control valve for controlling the direction of travel of the servo motor, and means for selectively increasing or decreasing the discharge pressure of the flow control valve to produce a cooperative movement of the servo motor and in turn an adjustment of the flow control valve rate until the normal discharge pressure has been re-established, and a restricted passage controlled by the directional valve for introducing a limited quantity of pressure fluid into the outlet of the flow control valve when the discharge pressure is below normal or for relieving any excess pressure above normal, thereby automatically assisting and anticipating the operation of the flow control valve to prevent overtravel of the servo motor.

6. In a remotely controlled power operated servo motor circuit with hydraulic follow-up, a source of pressure fluid supply, a servo motor connected to the pressure fluid supply and controlled by a pressure actuated directional valve, a hydraulic control circuit including two flow control valves connected in series to the source of pressure fluid supply, a linkage coupling the servo motor to the first flow control valve, and means connecting the directional valve to the pressure supply source and to the intermediate pressure between the flow control valves in the hydraulic control circuit whereby any change in the normal intermediate pressure will effect a movement of the servo motor and automatically adjust the first flow control valve to re-establish the normal intermediate pressure in the control circuit.

7. In a remotely controlled power operated servo motor circuit with hydraulic follow-up, a source of pressure fluid supply, a servo motor connected to the pressure fluid supply and controlled by a pressure actuated directional valve, a hydraulic control circuit including two flow control valves connected in series to the source of pressure fluid supply, a linkage coupling the servo motor to the first flow control valve, and means connecting the directional valve to the pressure supply source and to the intermediate pressure between the flow control valves in the hydraulic control circuit whereby any change in the normal intermediate pressure will effect a movement of the servo motor and automatically adjust the first flow control valve to re-establish the normal intermediate pressure in the control circuit, and a restricted passage controlled by the directional valve and hydraulically connecting the control circuit at a point between the two flow control valves to the supply source or to the outlet of the second flow control valve, for supplementing the function of the first flow control valve and preventing overtravel of the servo motor.

8. In a hydraulic transmission control, a source of pressure fluid supply, a servo motor hydraulically connected to the pressure fluid supply source, a hydraulic control circuit including two flow control valves hydraulically connected in series to the pressure fluid supply source, a directional valve responsive to variations in the intermediate pressure in the control circuit between the flow control valves for effecting movement of the servo motor in response to variations in flow rate through the second flow control valve, and means linking the servo motor to the first flow control valve for automatically adjusting the flow rate through the first flow control valve to equal the rate through the second flow control valve whereby the servo motor position bears a direct relationship to the flow rate through the control circuit.

9. In a hydraulic transmission control, a source of pressure fluid supply, a servo motor hydraulically connected to the pressure fluid supply source, a hydraulic control circuit including two flow control valves hydraulically connected in series to the pressure fluid supply source, a directional valve responsive to variations in the intermediate pressure in the control circuit between the flow control valves for effecting movement of the servo motor in response to variations in flow rate through the second flow control valve, and means linking the servo motor to the first flow control valve for automatically adjusting the flow rate through the first flow control valve to equal the rate through the second flow control valve whereby the servo motor position bears a direct relationship to the flow rate through the control circuit, and separate means directly controlled by the directional valve for supplementing the function of the first flow control valve and assist in reestablishing the normal intermediate pressure thereby preventing overtravel of the servo motor follow-up.

10. In a remotely controlled power operated servo motor circuit with hydraulic follow-up, a pump and tank unit, an operating circuit including a piston type servo motor and a directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and a linkage coupling the servo motor piston to the first flow control valve for automatically adjusting its flow rate in proportion to the movement of the servo piston and equalizing the flow rate through both flow control valves.

11. In a remotely controlled power operated servo motor circuit with hydraulic follow-up, a source of pressure and a tank unit, an operating circuit including a piston type servo motor and a directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and a linkage coupling the servo motor piston to the first flow control valve for automatically adjusting its flow rate in proportion to the movement of the servo piston and equalizing the flow rate through both flow control valves, and a compensating circuit controlled by the directional valve and adapted to selectively connect the control circuit at an intermediate point between the flow control valves to the source of pressure when the intermediate pressure drops below normal or to tank when the intermediate pressure rises above normal.

12. In a remotely controlled power operated servo motor circuit with hydraulic follow-up, a pump and tank unit, an operating circuit including a piston type servo motor and a directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and a linkage coupling the servo motor piston to the first flow control valve for automatically adjusting its flow rate in proportion to the movement of the servo piston and equalizing the flow rate through both flow control valves, and a restricted by-pass conduit in parallel with the first flow control valve and controlled by the directional valve for bleeding pressure fluid into the control circuit between the flow control valves independent of the operation of the servo motor when the intermediate pressure falls below normal.

13. In a remotely controlled power operated servo motor circuit with hydraulic follow-up, a pump and tank unit, an operating circuit including a piston type servo motor and a directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and a linkage coupling the servo motor piston to the first flow control valve for automatically adjusting its flow rate in proportion to the movement of the servo piston and equalizing the flow rate through both flow control valves, and a restricted by-pass conduit in parallel with the second flow control valve and controlled by the directional valve for bleeding pressure fluid out of the control circuit between the flow control valves independent of the operation of the servo motor when the intermediate pressure rises above normal.

14. In a remotely controlled power operated servo motor circuit with hydraulic follow-up, a pump and tank unit, an operating circuit including a piston type servo motor and a directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and linkage coupling the servo motor piston to the first flow control valve for automatically adjusting its flow rate in proportion to the movement of the servo piston and equalizing the flow rate through both flow control valves, and restricted by-pass conduits controlled by the directional valve for selectively by-passing the first flow control valve when the intermediate pressure in the control circuit between the flow control valves is below normal or by-passing the second flow control valve when the intermediate pressure is above normal.

15. In a remotely controlled power operated servo motor circuit with hydraulic follow-up, a source of pressure and a tank unit, an operating circuit including a piston type servo motor and a differential piston type directional valve for controlling the operation of the servo motor, a control circuit in parallel with the operating circuit including two flow control valves connected in series, pressure responsive means for actuating the directional valve in response to changes in the flow rate through the control circuit to effect a movement of the servo piston in proportion to the change in flow rate, and means for maintaining the difference in pressure between the source of pressure and the control circuit intermediate the two flow control valves in direct proportion to the difference in areas of the differential pistons of the directional valve.

RALPH L. TWEEDALE.

REFERENCES CITED

The following references are of record in the file of this patent:

UNITED STATES PATENTS

| Number | Name | Date |
|---|---|---|
| 2,177,098 | Doe et al. | Oct. 24, 1939 |
| 2,251,729 | Bach | Aug. 5, 1941 |
| 2,253,663 | Tweedale | Aug. 26, 1941 |

FOREIGN PATENTS

| Number | Country | Date |
|---|---|---|
| 423,676 | Germany | Jan. 1, 1926 |
| 459,893 | Great Britain | Jan. 18, 1937 |